UNITED STATES PATENT OFFICE.

OMAR A. STEMPEL, OF CHAMOIS, MISSOURI.

IMPROVEMENT IN COMPOSITIONS FOR PRESERVING EGGS.

Specification forming part of Letters Patent No. 203,790, dated May 14, 1878; application filed December 18, 1877.

*To all whom it may concern:*

Be it known that I, OMAR A. STEMPEL, of Chamois, in the county of Osage and State of Missouri, have invented a certain new and useful Composition for Preserving Eggs, of which the following is a specification:

My improvement relates to a composition for preserving eggs; and it consists in combining lime, salt, oil, and water in certain proportions, and securing to the solution a sealing-cap, composed of a film of oil, to prevent the evaporation of the solution, preserve it from noxious vapors, and allow of the abstraction of the eggs at any time without impairing its usefulness, the oil flowing easily back to its original sealing position, and thus dispensing with the necessity of any other cap or cover to the vessel in which the solution may be contained.

In carrying my invention into effect, I take of fresh-slaked lime one pint; common salt, one pint; coal-oil or other oil, one pint; water, five gallons.

It is preferred that the oil be added to the lime first, and the other materials afterward, as by this means, even after the water is added, a weak saponaceous character is given to the solution.

In a rather extensive practice as an egg-packer, I have found that the stronger solutions of lime and salt, or of either of them, are liable to impart to the eggs a bad color, and also to contract a bad smell when the vessel containing the same is placed in a cellar, which is the usual place of storage for such goods. I have also found that the weaker solutions, like the stronger, require to be changed at frequent intervals, as the antiseptic qualities of the solution cause it to take up foul gases and become overloaded with them, thus giving the solution a bad color and odor, and consequently transferring a portion of such bad color and odor to the eggs themselves. In seeking to overcome these causes of expense and loss, I have found that the addition of a small quantity of oil to the solution will cause a very weak solution to remain quite pure for many months, even in a bad atmosphere; and that no bad color or odor is found in the composition, nor are the eggs affected by the surrounding bad atmosphere.

I am aware that it is not new to use a film of oil for preserving preservative compounds, and this I do not claim broadly. The admixture of the oil with the other ingredients of my composition produces a new result—it renders the composition slightly saponaceous. The film which the oil forms on the top is necessary to prevent evaporation, which would certainly result where the eggs were constantly being removed. It moreover dispenses with the necessity of a cover or lid to the receptacle containing the eggs, as the oil forms a perfectly-sealing crust incapable of being broken.

What I do claim, and desire to secure by Letters Patent, is—

The composition for preserving eggs herein described, consisting of fresh-slaked lime, common salt, coal or other oil, and water, in about the proportions specified.

OMAR A. STEMPEL.

Witnesses:
HENRY MARQUAND,
J. W. RAMSEY.